(12) United States Patent
Morita et al.

(10) Patent No.: US 6,291,021 B1
(45) Date of Patent: *Sep. 18, 2001

(54) COATING MATERIAL

(75) Inventors: Yoshitsugu Morita; Haruhiko Furukawa; Takayuki Aso, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/448,555

(22) Filed: Nov. 23, 1999

(30) Foreign Application Priority Data

Nov. 30, 1998 (JP) .................................. 10-339899
May 17, 1999 (JP) .................................. 11-135875

(51) Int. Cl.⁷ .................................................. B05D 3/02
(52) U.S. Cl. ............... 427/387; 106/287.15; 106/287.16; 525/101; 526/279
(58) Field of Search ...................... 427/387; 106/287.16, 106/287.15; 526/279; 525/101

(56) References Cited

FOREIGN PATENT DOCUMENTS

| | | | |
|---|---|---|---|
| 57036109 A | 2/1982 | (JP) | C08F/002/38 |
| 58-154766 * | 9/1983 | (JP) | . |
| 9279064 A | 10/1997 | (JP) | C08F/290/06 |
| 11-1485 * | 1/1999 | (JP) | . |
| 11-1530 | 1/1999 | (JP) | C08F/299/08 |

* cited by examiner

Primary Examiner—Robert Dawson
Assistant Examiner—Marc S. Zimmer
(74) Attorney, Agent, or Firm—Catherine U. Brown; Robert L. McKellar; Charles R. Richard

(57) ABSTRACT

A highly weathering-resistant coating material exhibits an excellent water resistance and water repellency. The coating material contains a vinyl-type polymer that contains a pendant carbosiloxane dendrimer structure. The coating material is used on construction materials, buildings and structures undercoated with an organic coating material, automobiles, railroad rolling stock, ships, aircraft, and bridges, commercial and industrial plants, and electrical and electronic instruments and devices.

18 Claims, No Drawings

COATING MATERIAL

FIELD OF THE INVENTION

The invention relates to coating materials and more specifically to highly weathering-resistant coating materials that have an excellent gloss retention and water-repellency retention.

BACKGROUND OF THE INVENTION

Exposure to water, ultraviolet radiation, ozone, and other noxious factors can cause the unprotected surfaces of, for example, automobiles, various other vehicles, aircraft, bridges, buildings, etc., to suffer from timewise changes in quality (deterioration). This has led to the introduction of a large number of coating materials for the purpose of surface protection. Among the spectrum of coating materials, those based on acrylic resins are reported to have excellent resistance to weathering. Even in the case of acrylic resin coating materials, however, long-term exposure to such challenges as wind and rain and ultraviolet radiation still leads to degeneration and a concomitant decline in gloss, water repellency, and the protective film properties that were the initial reason for applying the coating.

As examples within the realm of coating materials that employ an organosilane or organopolysiloxane starting material, Japanese Application Number Sho 57-36109 teaches a coating material comprising a copolymer of γ-methacryloxypropyltrimethoxysilane and acrylic monomer, while Japanese Application Number Hei 9-279064 teaches a coating material based on a copolymer of acrylic monomer and linear alkylpolysiloxane bearing the methacryloxy group at a single terminal. These coating materials, however, have suffered from such problems as a low film strength and an unacceptable water repellency and particularly an unacceptable water-repellency retention.

The object of this invention is to solve the problems described above by providing a highly weathering-resistant coating material that in particular has an excellent gloss retention and water-repellency retention.

SUMMARY OF THE INVENTION

The coating material of the invention characteristically has as its base ingredient a vinyl-type polymer that contains a pendant carbosiloxane dendrimer structure.

DETAILED DESCRIPTION OF THE INVENTION

The vinyl-type polymer constituting the coating material of the invention contains a carbosiloxane dendrimer structure in a side-chain or pendant position on the polymer (this polymer is referred to below as pendant carbosiloxane dendrimer-functional vinyl-type polymer). This carbosiloxane dendrimer structure denotes a high-molecular-weight group with a predictable and highly branched structure that elaborates radially from a single core. An example of a carbosiloxane dendrimer having such a structure in a side-chain position is the highly branched siloxane-silalkylene copolymer taught in the specification of Japanese Application Number Hei 9-171154.

The carbosiloxane dendrimer structure in the vinyl-type polymer in the coating material of the invention preferably is a group with the following general formula.

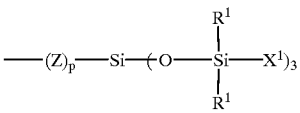

The group Z is a divalent organic group, for example, an alkylene group, arylene group, aralkylene group, ester-containing divalent organic group, ether-containing divalent organic group, ketone-containing divalent organic group, or amide-containing divalent organic group. Among the organic groups, those with the following structures are preferred.

—C(=O)—O—$R^9$—

—C(=O)—NH—$R^9$—

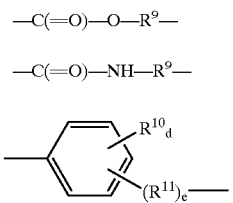

$R^9$ in the preceding structures represents $C_1$ to $C_{10}$ alkylene, for example, methylene, ethylene, propylene, and butylene with methylene and propylene being preferred. $R^{10}$ represents $C_1$ to $C_{10}$ alkyl, for example, methyl, ethyl, propyl, and butyl with methyl being preferred. $R^{11}$ represents $C_1$ to $C_{10}$ alkylene, for example, methylene, ethylene, propylene, and butylene with ethylene being preferred. The subscript d is an integer from 0 to 4, and the subscript e is 0 or 1. $R^1$ is $C_1$ to $C_{10}$ alkyl or aryl. The alkyl encompassed by $R^1$ is exemplified by methyl, ethyl, propyl, butyl, pentyl, isopropyl, isobutyl, cyclopentyl, and cyclohexyl. The aryl encompassed by $R^1$ is exemplified by phenyl and naphthyl. Methyl and phenyl are preferred for $R^1$, and methyl is particularly preferred. $X^1$ is the silylalkyl group with the following formula at i=1.

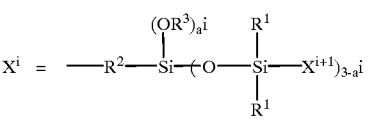

$R^1$ is defined as above. $R^2$ represents $C_2$ to $C_{10}$ alkylene and is exemplified by straight-chain alkylene such as ethylene, propylene, butylene, and hexylene, and by branched alkylene such as methylmethylene, methylethylene, 1-methylpentylene, and 1,4-dimethylbutylene. Ethylene, methylethylene, hexylene, 1-methylpentylene, and 1,4-dimethylbutylene are preferred for $R^2$. $R^3$ is $C_1$ to $C_{10}$ alkyl and can be exemplified by methyl, ethyl, propyl, butyl, and isopropyl. In the formula, i is an integer with a value from 1 to 10 that specifies the generation of said silylalkyl group, and $a^i$ is an integer from 0 to 3.

Preferred for use in the coating material of the invention is a carbosiloxane dendrimer-functional vinyl-type polymer afforded by the polymerization of (A) 0 to 99.9 weight parts vinyl monomer and (B) 100 to 0.1 weight parts carbosiloxane dendrimer that contains a radically polymerizable organic group and has the following general formula

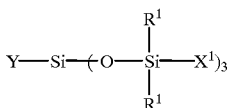

Y is a radically polymerizable organic group. $R^1$ is $C_1$ to $C_{10}$ alkyl or aryl. The alkyl encompassed by $R^1$ is exemplified by methyl, ethyl, propyl, butyl, pentyl, isopropyl, isobutyl, cyclopentyl, and cyclohexyl. The aryl encompassed by $R^1$ is exemplified by phenyl and naphthyl. Methyl and phenyl are preferred for $R^1$, and methyl is particularly preferred. $X^1$ is the silylalkyl group with the following formula at i=1.

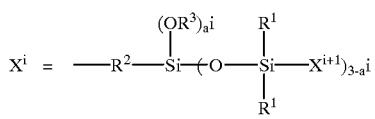

$R^1$ is defined as above; $R^2$ is $C_2$ to $C_{10}$ alkylene; $R^3$ is $C_1$ to $C_{10}$ alkyl, for example, methyl, ethyl, propyl, and butyl; $X^{i+1}$ is selected from the set consisting of the hydrogen atom, $C_1$ to $C_{10}$ alkyl, aryl, and the above-defined silylalkyl group; i is an integer with a value from 1 to 10 that specifies the generation of said silylalkyl group; and $a^i$ is an integer from 0 to 3.

Considering this vinyl-type polymer in greater detail, the vinyl monomer (A) should contain a radically polymerizable vinyl group, but the type and other properties of this monomer are not otherwise critical. This vinyl monomer (A) is exemplified by the monomers used as starting monomers for the organic resins generally known as vinyl resins. The vinyl monomer (A) is more specifically exemplified by lower alkyl (meth)acrylates such as methyl (meth)acrylate, ethyl (meth)acrylate, n-propyl (meth)acrylate, and isopropyl (meth)acrylate; higher alkyl (meth)acrylates such as n-butyl (meth)acrylate, isobutyl (meth)acrylate, tert-butyl (meth) acrylate, n-hexyl (meth)acrylate, cyclohexyl (meth)acrylate, 2-ethylhexyl (meth)acrylate, octyl (meth)acrylate, lauryl (meth)acrylate, and stearyl (meth)acrylate; the vinyl esters of lower aliphatic acids, such as vinyl acetate and vinyl propionate; the vinyl esters of higher aliphatic acids, such as vinyl butyrate, vinyl caproate, vinyl 2-ethylhexanoate, vinyl laurate, and vinyl stearate; aromatic vinyl monomers such as styrene, vinyltoluene, benzyl (meth)acrylate, phenoxyethyl (meth)acrylate, and vinylpyrrolidone; amide-functional vinyl monomers such as (meth)acrylamide, N-methylol (meth)acrylamide, isobutoxymethoxy(meth)acrylamide, and N,N-dimethyl(meth)acrylamide; hydroxyl-functional vinyl monomers such as 2-hydroxyethyl (meth)acrylate, 2-hydroxybutyl (meth)acrylate, and 2-hydroxypropyl (meth) acrylate; fluorinated vinyl monomers such as trifluoropropyl (meth)acrylate, perfluorobutylethyl (meth)acrylate, and perfluorooctylethyl (meth)acrylate; epoxy-functional vinyl monomers such as glycidyl (meth)acrylate and 3,4-epoxycyclohexylmethyl (meth)acrylate; carboxyl-functional vinyl monomers such as (meth)acrylic acid, itaconic acid, crotonic acid, and fumaric acid; ether linkage-containing vinyl monomers such as tetrahydrofurfuryl (meth)acrylate, butoxyethyl (meth)acrylate, ethoxydiethylene glycol (meth) acrylate, polyethylene glycol (meth)acrylate, polypropylene glycol mono(meth)acrylate, hydroxybutyl vinyl ether, cetyl vinyl ether, and 2-ethylhexyl vinyl ether; unsaturated group-functionalized silicone compounds such as (meth) acryloxypropyltrimethoxysilane, polydimethylsiloxane (branched or straight-chain) bearing a (meth)acryl group at a single terminal, and polydimethylsiloxane bearing a styryl group at a single terminal; butadiene; vinyl chloride; vinylidene chloride; (meth)acrylonitrile; dibutyl fumarate; maleic anhydride; dodecylsuccinic anhydride; (meth)acryl glycidyl ether; the alkali metal salts, ammonium salts, and organic amine salts of radically polymerizable unsaturated carboxylic acids such as methacrylic acid, itaconic acid, crotonic acid, fumaric acid, and maleic acid; radically polymerizable unsaturated monomers that contain a sulfonic acid residue, e.g., styrenesulfonic acid, as well as their alkali metal salts, ammonium salts, and orglanic amine salts; quaternary ammonium salts that are derived from (meth) acrylic acid, such as 2-hydroxy-3-methacryloxypropyltrimethylammonium chloride; and the methacrylate esters of alcohols that contain a tertiary amine group, such as the diethylamine ester of methacrylic acid, as well as the quaternary ammonium salts thereof.

Also usable are multifunctional vinyl monomers, as exemplified by (meth)acryloyl-functional monomers such as trimethylolpropane tri(meth)acrylate, pentaerythritol tri (meth)acrylate, ethylene glycol di(meth)acrylate, tetraethylene glycol di(meth)acrylate, polyethylene glycol di(meth) acrylate, 1,4-butanediol di(meth)acrylate, 1,6-hexanediol di(meth)acrylate, neopentyl glycol di(meth)acrylate, trimethylolpropane trioxyethyl(meth)acrylate, tris(2-hydroxyethyl)isocyanurate di(meth)acrylate, tris(2-hydroxyethyl)isocyanurate tri(meth)acrylate, the di(meth) acrylates of diols that are the adducts of ethylene oxide or propylene oxide on bisphenol A, the di(meth)acrylates of diols that are the adducts of ethylene oxide or propylene oxide on hydrogenated bisphenol A, and triethylene glycol divinyl ether; and also by unsaturated group-functional silicone compounds such as polydimethylsiloxane endblocked at both terminals by the styryl group and polydimethylsiloxane endblocked at both terminals by methacryloxypropyl.

Also usable as component (A) are organosilicon compounds that contain both a hydrolyzable group and a vinyl-type radically polymerizable unsaturated group. Compounds of this type are preferred for their ability to raise the film strength and improve the water-repellency retention. The radically polymerizable group in this class of compounds is exemplified by (meth)acryloxy-functional organic groups, (meth)acrylamide-functional organic groups, styryl-functional organic groups, $C_2$ to $C_{10}$ alkenyl, vinyloxy, and allyloxy. The hydrolyzable group in this class of compounds is exemplified by halogen, alkoxy, and acetoxy. The instant organosilicon compounds are specifically exemplified by methacryloxypropyltrimethoxysilane, methacryloxypropylmethyldimethoxysilane, methacryloxypropyldimethylmethoxysilane, acryloxypropyltrimethoxysilane, acryloxypropylmethyldimethoxysilane, acryloxypropyldimethylmethoxysilane, vinyltrimethoxysilane, vinyltriethoxysilane, vinylbutyldibutoxysilane, and the partial hydrolysis and condensation products of the preceding.

The carbosiloxane dendrimer (B) has the following general formula.

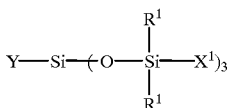

Y in this general formula is a radically polymerizable organic group. Generally this will be a group capable of undergoing radical-mediated addition, while more specifically this group is exemplified by $C_2$ to $C_{10}$ alkenyl and by the (meth)acryloxy-functional organic groups, (meth) acrylamide-functional organic groups, and styryl-functional organic groups with the following general formulas.

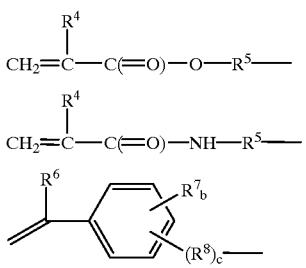

$R^4$ and $R^6$ are hydrogen or methyl; $R^5$ and $R^8$ are $C_1$ to $C_{10}$ alkylene; $R^7$ is $C_1$ to $C_{10}$ alkyl; b is an integer from 0 to 4; and c is 0 or 1.

The subject radically polymerizable organic groups are exemplified by acryloxymethyl, 3-acryloxypropyl, methacryloxymethyl, 3-methacryloxypropyl, 4-vinylphenyl, 3-vinylphenyl, 4-(2-propenyl)phenyl, 3-(2-propenyl)phenyl, 2-(4-vinylphenyl)ethyl, 2-(3-vinylphenyl)ethyl, vinyl, allyl, methallyl, and 5-hexenyl. $R^1$ in the preceding general formula for the carbosiloxane dendrimer (B) is $C_1$ to $C_{10}$ alkyl or aryl. The alkyl encompassed by $R^1$ are exemplified by methyl, ethyl, propyl, butyl, pentyl, isopropyl, isobutyl, cyclopentyl, and cyclohexyl. The aryl encompassed by $R^1$ are exemplified by phenyl and naphthyl. Methyl and phenyl are preferred for $R^1$, and methyl is particularly preferred. $X^1$ is the silylalkyl group with the following formula at i=1.

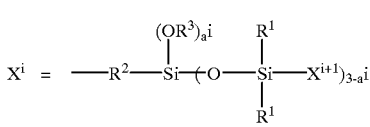

$R^1$ is defined as above. $R^2$ represents $C_2$ to $C_{10}$ alkylene and is exemplified by straight-chain alkylene such as ethylene, propylene, butylene, and hexylene, and by branched alkylene such as methylmethylene, methylethylene, 1-methylpentylene, and 1,4-dimethylbutylene. Ethylene, methylethylene, hexylene, 1-methylpentylene, and 1,4-dimethylbutylene are preferred for $R^2$. $R^3$ is $C_1$ to $C_{10}$ alkyl, for example, methyl, ethyl, propyl, butyl, or isopropyl. $X^{i+1}$ is selected from the set consisting of the hydrogen atom, $C_1$ to $C_{10}$ alkyl, aryl, and the above-defined silylalkyl group. In the formula, $a^i$ is an integer from 0 to 3, and i is an integer with a value from 1 to 10 that specifies the generation of said silylalkyl group, i.e., that indicates the number of repetitions of this silylalkyl group. Thus, the carbosiloxane dendrimer (B) has the following general formula when the number of generations is 1:

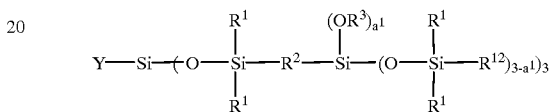

wherein Y, $R^1$, $R^2$, and $R^3$ are defined as above; $R^{12}$ is the hydrogen atom or is defined as for $R^1$; $a^1$ is defined as for $a^i$; and the average of the sum of the $a^1$ values in each molecule is from 0 to 7.

The carbosiloxane dendrimer (B) has the following general formula when the number of generations is 2:

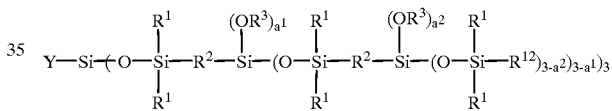

wherein Y, $R^1$, $R^2$, $R^3$, and $R^{12}$ are defined as above; $a^1$ and $a^2$ are defined as for $a^i$; and the average of the sum of the $a^1$ and $a^2$ values in each molecule is from 0 to 25.

The carbosiloxane dendrimer (B) has the following general formula when the number of generations is 3:

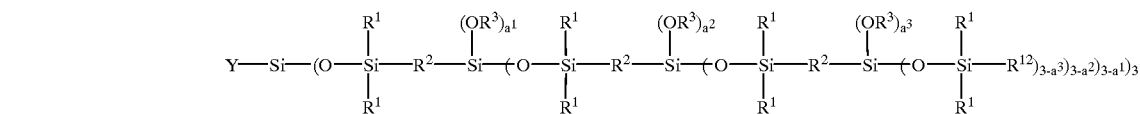

wherein Y, $R^1$, $R^2$, $R^3$, and $R^{12}$ are defined as above; $a^1$, $a^2$ and $a^3$ are defined as for $a^i$; and the average of the sum of the $a^1$, $a^2$ and $a^3$ values in each molecule is from 0 to 79.

Carbosiloxane dendrimers with the following average compositional formulas are examples of component (B), i.e., carbosiloxane dendrimer functionalized with a radically polymerizable organic group.

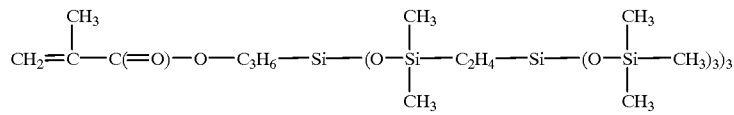

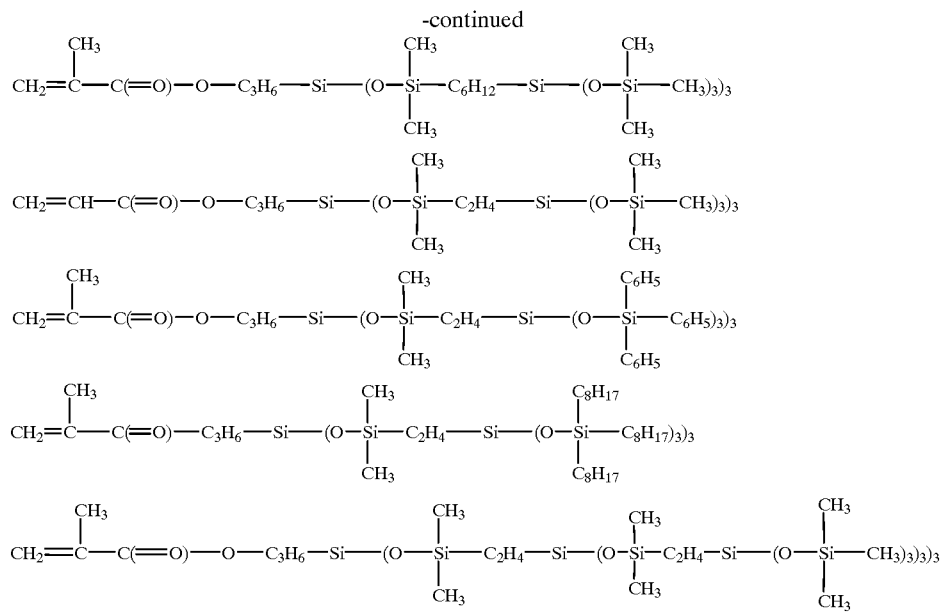
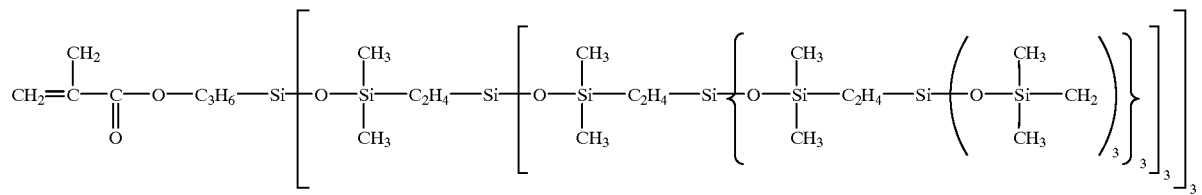
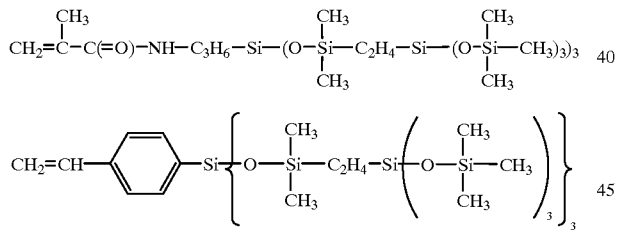
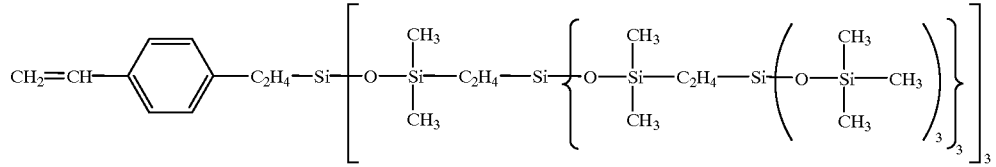

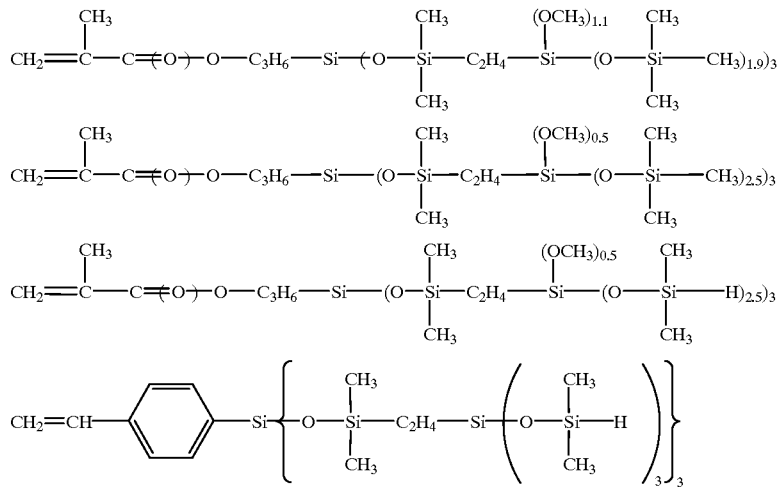

The carbosiloxane dendrimer described above can be synthesized, for example, by the method for synthesizing the branched siloxane-silalkylene copolymer described in Japanese Application Number Hei 9-171154. This synthesis can be carried out, for example, by running a hydrosilylation reaction between an alkenyl-functional organosilicon compound and an SiH-functional silicon compound with the following general formula

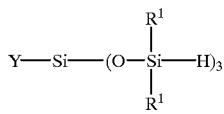

wherein $R^1$ and Y are defined as above.

The silicon compound with this general formula is exemplified by 3-methacryloxypropyltris(dimethylsiloxy)silane, 3-acryloxypropyltris(dimethylsiloxy)silane, and 4-vinylphenyltris(dimethylsiloxy)silane.

The alkenyl-functional organosilicon compound is exemplified by vinyltris(trimethylsiloxy)silane, vinyltris (dimethylphenylsiloxy)silane, and 5-hexenyltris (trimethylsiloxy)silane. This hydrosilylation reaction is preferably run in the presence of a transition metal catalyst, e.g., chloroplatinic acid or a platinum-vinylsiloxane complex.

The component (A): component (B) polymerization ratio in the dendrimer-functional vinyl-type polymer used in the present invention should be in the range from 0:100 to 99.9:0.1 as the component (A): component (B) weight ratio and is preferably from 1:99 to 99:1. A ratio of 0:100 indicates that the subject polymer may be a homopolymer of component (B).

The pendant carbosiloxane dendrimer-functional vinyl-type polymer used in the present invention is afforded by the copolymerization of the above-described components (A) and (B) or by the polymerization of component (B) alone. The polymerization method can be a radical polymerization method or an ionic polymerization method, but radical polymerization methods are preferred. This radical polymerization will optimally be a solution polymerization in which components (A) and (B) are reacted in solvent in the presence of a radical initiator for 3 to 20 hours at a temperature of 50 to 180° C.

The solvent used for this solution polymerization can be exemplified by aliphatic hydrocarbons such as hexane, octane, decane and cyclohexane; aromatic hydrocarbons such as benzene, toluene, and xylene; ethers such as diethyl ether, dibutyl ether, tetrahydrofuran, and dioxane; ketones such as acetone, methyl ethyl ketone, methyl isobutyl ketone, and diisobutyl ketone; esters such as methyl acetate, ethyl acetate, butyl acetate, and isobutyl acetate; alcohols such as methanol, ethanol, isopropyl alcohol, and butanol; and organosiloxane oligomers such as octamethylcyclotetrasiloxane, decamethylcyclopentasiloxane, hexamethyldisiloxane, and octamethyltrisiloxane.

Those compounds generally known in the art for use in radical polymerization can be used as the radical initiator for the solution polymerization under consideration. These are specifically exemplified by azobis compounds such as 2,2'-azobis(isobutyronitrile), 2,2'-azobis(2-methylbutyronitrile), and 2,2'-azobis(2,4-dimethylvaleronitrile), and by organoperoxides such as benzoyl peroxide, lauroyl peroxide, tert-butyl peroxybenzoate, and tert-butyl peroxy-2-ethylhexanoate.

This radical initiator can be a single compound or a combination of two or more compounds. The radical initiator is preferably used at from 0.1 to 5 weight parts for each 100 weight parts of the sum of components (A) and (B). A chain transfer agent may also be added to the polymerization.

This chain transfer agent is specifically exemplified by mercapto compounds such as 2-mercaptoethanol, butyl mercaptan, n-dodecyl mercaptan, 3-mercaptopropyltrimethoxysilane, and mercaptopropyl-functional polydimethylsiloxane, and by halogenated compounds such as methylene chloride, chloroform, carbon tetrachloride, butyl bromide, and 3-chloropropyltrimethoxysilane. Production of the vinyl-type polymer of the invention preferably includes a post-polymerization removal of the residual unreacted vinyl monomer by heating under reduced pressure.

Considering the ease of blending the coating material, the number-average molecular weight of the pendant carbosiloxane dendrimer-functional vinyl-type polymer used in this invention is preferably from 3,000 to 2,000,000 and more preferably is from 5,000 to 800,000. This polymer can take the form of a liquid, gum, paste, solid, or powder.

The coating material of the invention can also contain a copolymer prepared from vinyl monomer and an organosilicon compound containing both a hydrolyzable group and a radically polymerizable unsaturated group. This organosilicon compound is exemplified by methacryloxypropyltrimethoxysilane, methacryloxypropylmethyldimethoxysilane, methacryloxypropyldimethylmethoxysilane, acryloxypropyltrimethoxysilane, acryloxypropylmethyldimethoxysilane, acryloxypropyldimethylmethoxysilane, vinyltrimethoxysilane, vinyltriethoxysilane, and vinylbutyldibutoxysilane. The vinyl monomer used in this copolymer is exemplified by the vinyl monomers provided above for component (A). This copolymer is readily synthesized by suitable adaptation of the production method described above for the carbosiloxane dendrimer-functional vinyl-type polymer.

Acrylic resin can also be blended with the pendant carbosiloxane dendrimer-functional vinyl-type polymer used in this invention. The acrylic resins used for this purpose encompass the acrylic resins generally used as components in coating materials. Their type and other properties are not critical, but acrylic resins bearing hydrolyzable silyl groups are preferred.

In addition, this acrylic resin preferably takes the form of a water-based acrylic resin emulsion. When a water-based acrylic emulsion is employed, in a preferred embodiment the pendant carbosiloxane dendrimer-functional vinyl-type polymer used in the present invention is itself formulated as a water-based emulsion and the two emulsions are intermixed. When an acrylic resin is used, the pendant carbosiloxane dendrimer-functional vinyl-type polymer used in the invention will generally be used at from 10 to 200 weight parts per 100 weight parts acrylic resin.

Water-based emulsions of the pendant carbosiloxane dendrimer-functional vinyl-type polymer used in the invention are readily produced, for example, by adding 0.1 to 10 weight parts surfactant per 100 weight parts of the mixture of components (A) and (B), preparing therefrom an emulsified dispersion in aqueous medium, and then effecting emulsion polymerization using a water-soluble radical polymerization initiator.

The surfactant used for this purpose is exemplified by alkylbenzenesulfonates such as sodium dodecylbenzenesulfonate, alkylnaphthalenesulfonates, the sodium salts of polyoxyethylene alkylaryl ether sulfonate monoesters, and sodium lauryl sulfate.

The water-soluble radical polymerization initiator used for this emulsion polymerization is exemplified by inorganic peroxides such as potassium persulfate, sodium persulfate, and ammonium persulfate; organoperoxides such as tert-butylperoxymaleic acid, succinic peroxide, and tert-butyl hydroperoxide; and azobis compounds such as 2,2'-azobis (2-(N-benzylamidino)propane) hydrochloride, 2,2'-azobis (2-(N-hydroxyethylamidino)propane) hydrochloride, and 2,2'-azobis(2-methyl-N-hydroxyethyl)propionamide.

The copolymer emulsion can also be prepared by using acrylic acid or methacrylic acid as part of the other polymerizable monomer, preparing an emulsified dispersion by neutralization with a tertiary amine such as triethanolamine, and then effecting emulsion polymerization using a water-soluble radical polymerization initiator.

A hydrolyzable group-functional silane or partial condensate thereof or a hydrolyzable group-functional silicone resin may also be blended into the coating material of the invention as a curing agent.

Additives such as colorants, stabilizers, leveling agents, oils and fats, waxes, and fillers may also be added to the composition of the invention as desired or as necessary. The composition of the invention may also contain a condensation reaction accelerating catalyst within a range that does not impair the stability of the composition. This catalyst is exemplified by organometal salts, metal alkoxides, metal chelates, organic amines, quaternary ammonium salts, and the esters of organophosphoric acids.

The coating material of the invention can be applied to various substrates by application of this composition to the substrate surface by brush application, roller coating, flow coating, dipping, or spray coating. The preferred coating weight is from 1 to 1,000 grams per $m^2$ of the substrate, while an even more preferred coating weight is from 10 to 200 grams per $m^2$ of the substrate.

Since the base ingredient of the above-described coating material of the invention is pendant carbosiloxane dendrimer-functional vinyl-type polymer, upon application to the substrate this coating material forms a film whose surface layer contains carbosiloxane dendrimer structures. As a consequence, the coating material of the invention exhibits an excellent weathering resistance, an excellent water-repellency retention performance and gloss retention performance, and also has an excellent water resistance and resistance to icing. These characteristics make the coating material of the invention useful as a coating material for a variety of substrates, for example, as a surface-protective material and as a paint.

Thus, the coating material of the invention is useful as a coating material for construction materials, for example, for porous inorganic materials such as cement concrete, mortar, concrete block, slate, brick, roofing and surfacing tile, and stone. In particular, the coating material of the invention is useful as a coating material for application to buildings and structures undercoated with an organic coating material such as an epoxy coating material, acrylic coating material, or alkyd coating material. The coating material of the invention is also useful as a coating material for automobiles, railroad rolling stock, ships, aircraft, and bridges, in which the substrate is a metal such as steel sheet, aluminum sheet, and the like. Otherwise, the coating material of the invention is useful as a coating material for commercial and industrial plants and for electrical and electronic instruments and devices.

EXAMPLES

These examples are intended to illustrate the invention to those skilled in the art and should not be interpreted as limiting the scope of the invention set forth in the claims. In the examples that follow, parts denotes weight parts and the values reported for viscosity were measured at 25° C.

Reference Example 1

The film properties were measured by the methods described below.
Pencil Hardness
This was measured by a method conforming to the pencil scratch test described in Japanese Industrial Standard (JIS) K 5400, Section 6, Paragraph 14.
Crosshatch (checkerboard) Adhesion
In conformity with the method specified by the crosshatch test in JIS K 5400, Section 6, Paragraph 15, six cuts were scribed lengthwise and six cuts were scribed laterally, in each case on a 2-mm interval using a knife cutter. Cellophane tape was then pasted on the film and forcefully peeled off and the number of squares of the film remaining after tape removal was recorded.

Contact Angle Versus Water

This value was measured using an automatic contact angle instrument from Kyowa Kaimen Kagaku Kabushiki Kaisha.

Water Resistance

The film appearance was visually inspected after it had been immersed for 1 week in water.

The results of this inspection were scored and reported using the following scale.

+:no abnormalities

Δ:partial wetting phenomena

×:substantial wetting phenomena

Staining Resistance

The cured film was marked on with a black ink pen (MAGIC INK™ from Pentel). After air drying for 10 minutes, the film was wiped with defatted cotton soaked with isopropanol and was then visually evaluated using the following scale.

+: absolutely no markings remained

×: residual marking was present

Weathering Resistance

The gloss retention (%) and contact angle versus water (water-repellency retention performance) were measured after exposure for 1 month in a Sunshine Super longlife Weathermeter from Suga Test Instruments Co., Ltd.

Reference Example 2

A mixture of 82 parts methyl methacrylate, 11 parts n-butyl acrylate, 7 parts γ-methacryloxypropyltrimethoxysilane, and 1 part radical polymerization initiator (V-601 from Wako Pure Chemical Ind., Ltd.) was added dropwise over 2 hours at 80° C. under a nitrogen current to 100 parts xylene. After the completion of addition, the reaction was ripened for 6 hours at 80° C. to give a copolymer solution with a 50 weight % nonvolatile fraction (molecular weight (as polystyrene)=25,000, viscosity=250 mPa·s). A white enamel A was prepared by mixing 20 parts titanium oxide and 0.5 part dibutyltin dioctoate into 100 parts of the copolymer solution.

Reference Example 3

50 parts methyl methacrylate, 30 parts of the carbosiloxane dendrimer as follows

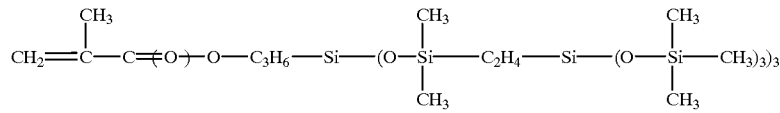

12 parts butyl methacrylate, 8 parts γ-methacryloxypropyltrimethoxysilane, and 1 part radical polymerization initiator (V-601 from Wako Pure Chemical Ind., Ltd.) were added dropwise over 2 hours at 80° C. under a nitrogen current to 100 parts toluene. After the completion of addition, the reaction was ripened for 6 hours at 80° C. to give a copolymer solution B-1 with a 51 weight % nonvolatile fraction (molecular weight (as polystyrene)=32,000, viscosity=270 mPa·s).

Reference Example 4

50 parts methyl methacrylate, 30 parts of the same carbosiloxane dendrimer as used in Reference Example 3, 20 parts butyl methacrylate, and 1 part radical polymerization initiator (V-601 from Wako Pure Chemical Ind., Ltd.) were added dropwise over 2 hours at 80° C. under a nitrogen current to 100 parts toluene. After the completion of addition, the reaction was ripened for 6 hours at 80° C. to give a copolymer solution B-2 with a 50 weight % nonvolatile fraction (molecular weight (as polystyrene)=32,000, viscosity=270 mPa·s).

Reference Example 5

30 parts of the same carbosiloxane dendrimer as used in Reference Example 3 was dissolved in a liquid mixture of 69 parts butyl methacrylate and 1 part methacrylic acid. To the resulting mixed solution was added 2 parts sodium lauryl sulfate and 50 parts deionized water with dispersion and emulsification. 150 parts of this emulsified dispersion of the aforesaid monomer mixture was added dropwise with stirring over 4 hours to a separate flask containing a mixture of 70 parts deionized water and 10 parts of a 10 weight % aqueous ammonium persulfate solution while maintaining this mixture at 80° C. under a nitrogen current. The reaction was ripened for an additional 2 hours at 80° C. after the completion of addition to afford a copolymer emulsion B-3 containing 42 weight % nonvolatile fraction (molecular weight (as polystyrene)=160,000).

Reference Example 6

A copolymer emulsion B-4 was prepared as in Reference Example 5, but in this case using the compound specified below in place of the carbosiloxane dendrimer that was used in Reference Example 5. Its molecular weight (as polystyrene) was 130,000 and its nonvolatile fraction was 42 weight %.

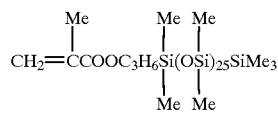

(Me=methyl in the preceding structure)

Example 1

150 parts of the copolymer solution B-1 as prepared in Reference Example 3 was thoroughly mixed into 100 parts white enamel A as prepared in Reference Example 2. The resulting mixture was sprayed onto a polished soft steel sheet (thickness=0.5 mm) to give a dry film thickness of 20 μm. The coating was formed by subsequently drying for 1 week at room temperature. The properties of this coating were measured and the results are in Table 1.

Example 2

150 parts of the copolymer solution B-2 as prepared in Reference Example 4 was thoroughly mixed into 100 parts white enamel A as prepared in Reference Example 2. The resulting mixture was sprayed onto polished soft steel sheet (thickness=0.5 mm) so as to give a dry film thickness of 20 μm. The coating was formed by subsequently drying for 1 week at room temperature. The properties of this coating were measured and the results are in Table 1.

Example 3

150 parts copolymer emulsion B-3 was thoroughly mixed into 100 parts of a water-based acrylic paint (Kanpe Papirio Co., Ltd., sky-blue emulsion coating, approximately 60 weight % nonvolatile fraction). The resulting mixture was sprayed onto polished soft steel sheet (thickness=0.5 mm) so as to give a dry film thickness of 20 μm. The coating was formed by subsequently drying for 1 week at room temperature. The properties of this coating were measured and the obtained results are in Table 1.

Comparative Example 1

The white enamel A produced according to Reference Example 2 was sprayed onto a polished soft steel sheet (thickness=0.5 mm) so as to give a dry film thickness of 20 μm. The coating was formed by subsequently drying for 1 week at room temperature. The properties of this coating were measured and the results are in Table 1.

Comparative Example 2

The aforementioned water-based acrylic paint (Kanpe Papirio Co., Ltd., sky-blue emulsion coating, approximately 60 weight % nonvolatile fraction) was sprayed onto a polished soft steel sheet (thickness=0.5 mm) so as to give a dry film thickness of 20 μm. The coating was formed by subsequently drying for 1 week at room temperature. The properties of this coating were measured and the results are in Table 1.

Comparative Example 3

A coating was formed on a polished soft steel sheet (thickness=0.5 mm) by the procedure of Example 3, but in this case using the copolymer emulsion B-4 prepared according to Reference Example 6 in place of the copolymer emulsion B-3 that was used in Example 3. The properties of this coating were measured and the results are in Table 1.

TABLE 1

| | Ex. 1 | Ex. 2 | Ex. 3 | Comp. Ex. 1 | Comp. Ex. 2 | Comp. Ex. 3 |
|---|---|---|---|---|---|---|
| pencil hardness | 2H | 2H | H | 2H | F | F |
| crosshatch adhesion | 25/25 | 25/25 | 25/25 | 10/25 | 25/25 | 25/25 |
| contact angle versus water | 109 | 107 | 106 | 68 | 63 | 103 |
| water resistance | + | + | + | Δ | Δ | + |
| staining resistance | + | + | + | Δ | x | Δ |
| weathering resistance | | | | | | |
| gloss retention | 98 | 96 | 88 | 65 | 58 | 73 |
| contact angle versus water | 106 | 103 | 102 | 51 | 45 | 82 |

We claim:

1. A coating material comprising:

I) a pendant carbosiloxane-dendrimer functional vinyl-type polymer comprising a carbosiloxane dendrimer group having the structure

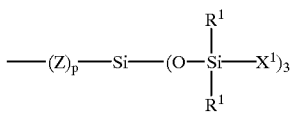

wherein Z is a divalent organic group; p is 0 or 1; $R^1$ is selected from the group consisting of $C_1$ to $C_{10}$ alkyl and aryl groups; and $X^1$ is a silylalkyl group at i=1 having the formula

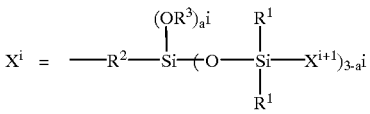

wherein $R^1$ is defined as above; $R^2$ is a $C_2$ to $C_{10}$ alkylene group; $R^3$ is a $C_1$ to $C_{10}$ alkyl group; $X^{i+1}$ is selected from the group consisting of a hydrogen atom, a $C_1$ to $C_{10}$ alkyl group, an aryl group, and said silylalkyl group; i is an integer with a value from 1 to 10; and $a^i$ is an integer from 0 to 3; and II) an acrylic resin, with the proviso that the acrylic resin does not contain a pendant carbosiloxane dendrimer structure.

2. The coating material of claim 1, wherein I) the vinyl-type polymer is prepared by a process comprising polymerization of a composition comprising (B) a carbosiloxane dendrimer having the general formula

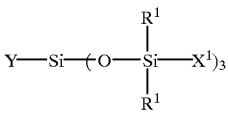

wherein Y is a radically polymerizable organic group, $R^1$ is selected from the group consisting of $C_1$ to $C_{10}$ alkyl and aryl, and $X^1$ is a silylalkyl group with the following formula at i=1

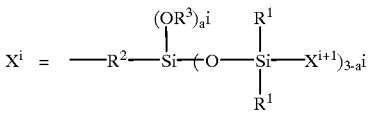

wherein $R^1$ is defined as above; $R^2$ is a $C_2$ to $C_{10}$ alkylene group; $R^3$ is a $C_1$ to $C_{10}$ alkyl group; $X^{i+1}$ is selected from the group consisting of a hydrogen atom, a $C_1$ to $C_{10}$ alkyl group, an aryl group, and said silylalkyl group; i is an integer with a value from 1 to 10; and $a^i$ is an integer from 0 to 3.

3. The coating material of claim 2, wherein the radically polymerizable organic group in component (B) is selected from the group consisting of:

(1) acryl- and methacryl-functional organic groups having the formulas

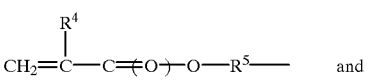

and

-continued

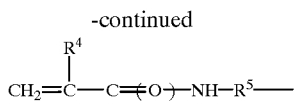

wherein $R^4$ is selected from the group consisting of a hydrogen atom and a methyl group and $R^5$ is a $C_1$ to $C_{10}$ alkylene group;

(2) a styryl-functional organic group having the formula

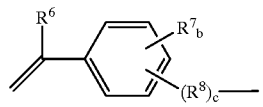

wherein $R^6$ is selected from the group consisting of a hydrogen atom and a methyl group, $R^7$ is a $C_1$ to $C_{10}$ alkyl group, $R^8$ is a $C_1$ to $C_{10}$ alkylene group, b is an integer from 0 to 4, c is 0 or 1; and (3) $C_2$ to $C_{10}$ alkenyl groups.

4. The coating material of claim 2, wherein i is 1, and (B) the carbosiloxane dendrimer has the formula:

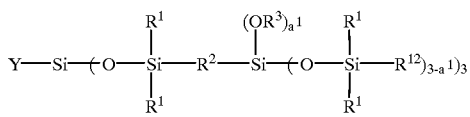

wherein Y, $R^1$, $R^2$, and $R^3$ are defined as above; $R^{12}$ is selected from the group consisting of a hydrogen atom and $R^1$; $a^i$ is $a^1$; and the carbosiloxane dendrimer has an average sum of $a^1$ values in each molecule from 0 to 7.

5. The coating material of claim 2, wherein i is 2 and (B) the carbosiloxane dendrimer has the formula:

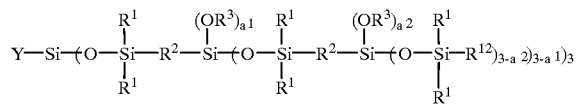

wherein Y, $R^1$, $R^2$, and $R^3$ are defined as above, $R^{12}$ is selected from the group consisting of a hydrogen atom and $R^1$; $a^1$ and $a^2$ are defined as for $a^i$; and (B) has an average sum of $a^1$ and $a^2$ values in each molecule from 0 to 25.

6. The coating material of claim 2, wherein i is 3 and (B) the carbosiloxane dendrimer has the formula:

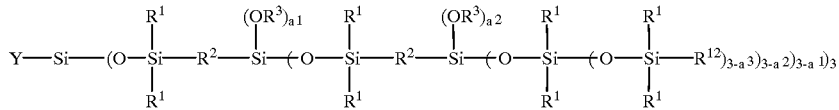

wherein Y, $R^1$, $R^2$, and $R^3$, are defined as above, $R^{12}$ is selected from the group consisting of a hydrogen atom and $R^1$; $a^1$, $a^2$, and $a^3$ are defined as for $a^i$; and (B) the carbosiloxane dendrimer has an average sum of $a^1$, $a^2$, and $a^3$ in each molecule from 0 to 79.

7. The coating material of claim 2, wherein the composition further comprises component (A) a vinyl monomer.

8. The coating material of claim 7, wherein component (A) is selected from the group consisting of lower alkyl (meth)acrylates; higher alkyl (meth)acrylates; vinyl esters of lower aliphatic acids; vinyl esters of higher aliphatic acids; aromatic vinyl monomers; amide-functional vinyl monomers; hydroxyl-functional vinyl monomers; fluorinated vinyl monomers; epoxy-functional vinyl monomers; carboxyl-functional vinyl monomers; ether linkage-containing vinyl monomers; unsaturated group-functionalized silicone compounds; butadiene; vinyl chloride; vinylidene chloride; (meth)acrylonitrile; dibutyl fumarate; maleic anhydride; dodecylsuccinic anhydride; (meth)acryl glycidyl ether; alkali metal salts, ammonium salts, and organic amine salts of radically polymerizable unsaturated carboxylic acids; radically polymerizable unsaturated monomers that contain a sulfonic acid residue and alkali metal salts, ammonium salts, and organic amine salts thereof; quaternary ammonium salts derived from (meth)acrylic acid; methacrylate esters of alcohols that contain a tertiary amine group and quaternary ammonium salts thereof, multifunctional vinyl monomers; unsaturated group functional silicone compounds; and organosilicon compounds that contain both a hydrolyzable group and a vinyl-type radically polymerizable unsaturated group.

9. The coating material of claim 1, wherein II) the acrylic resin contains at least 2 hydrolyzable silyl groups in each molecule.

10. The coating material of claim 9, wherein II) the acrylic resin is a water-based acrylic resin emulsion.

11. A method for preparing a coating material, said method comprising:

1) emulsifying and dispersing a composition comprising component (B) in component (II) a water-based acrylic resin emulsion in the presence of component (C) a surfactant, wherein component (B) is a carbosiloxane dendrimer having the general formula

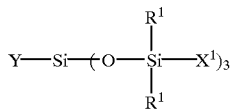

wherein Y is a radically polymerizable organic group, $R^1$ is selected from the group consisting of $C_1$ to $C_{10}$ alkyl and aryl, and $X^1$ is a silylalkyl group with the following formula at i=1

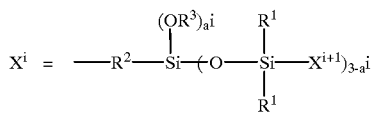

wherein $R^1$ is defined as above; $R^2$ is a $C_2$ to $C_{10}$ alkylene group; $R^3$ is a $C_1$ to $C_{10}$ alkyl group; $X^{i+1}$ is selected from the group consisting of a hydrogen atom, a $C_1$ to $C_{10}$ alkyl group, an aryl group, and said silylalkyl group; i is an integer with a value from 1 to 10; and $a^i$ is an integer from 0 to 3; and 2) effecting radical polymerization of the composition comprising component (B) in the presence of component (D) a water-soluble radical polymerization initiator.

12. The method of claim 11, wherein component (C) is selected from the group consisting of alkylbenzenesulfonates, sodium salts of polyoxyethylene alkylarylether sulfonate monoesters, and sodium lauryl sulfate.

13. The method of claim 11, wherein component (D) is selected from the group consisting of inorganic peroxides, organoperoxides, azobis compounds, and combinations thereof.

14. The method of claim 11, wherein the composition further comprises (A) a vinyl monomer.

15. The method of claim 11, wherein the composition further comprises an additive selected from the groups consisting of colorants, stabilizers, leveling agents, oils and fats, waxes, fillers, and condensation reaction accelerating catalysts.

16. The method of claim 11, wherein step 2) is carried out by heating to 50 to 180° C.

17. A substrate coated by the method of claim 11.

18. The substrate of claim 17, wherein the substrate is selected from the group consisting of construction materials, buildings and structures undercoated with an organic coating material, automobiles, railroad rolling stock, ships, aircraft, and bridges, commercial and industrial plants, and electrical and electronic instruments and devices.

* * * * *